(12) United States Patent
Steiner et al.

(10) Patent No.: US 8,873,734 B2
(45) Date of Patent: Oct. 28, 2014

(54) GLOBAL LOGGING AND ANALYSIS SYSTEM

(71) Applicant: Avaya Inc., Basking Ridge, NJ (US)

(72) Inventors: Robert C. Steiner, Broomfield, CO (US); Marc A. Geist, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/837,272

(22) Filed: Mar. 15, 2013

(65) Prior Publication Data

US 2014/0270137 A1   Sep. 18, 2014

(51) Int. Cl.
*H04M 3/00* (2006.01)
*H04M 5/00* (2006.01)
*H04M 3/51* (2006.01)

(52) U.S. Cl.
CPC .................................. *H04M 3/5175* (2013.01)
USPC ............ 379/265.05; 379/265.01; 379/265.03; 379/265.06; 379/265.11

(58) Field of Classification Search
USPC ............. 379/265.01, 265.05, 265.11, 265.06, 379/265.03, 265.12, 265.13
See application file for complete search history.

(56) References Cited

U.S. PATENT DOCUMENTS

| | | |
|---|---|---|
| 2010/0235218 A1 | 9/2010 | Erhart et al. |
| 2010/0296417 A1 | 11/2010 | Steiner |
| 2011/0125793 A1 | 5/2011 | Erhart et al. |
| 2011/0125826 A1 | 5/2011 | Erhart et al. |
| 2011/0255683 A1 | 10/2011 | Flockhart et al. |
| 2012/0257518 A1 | 10/2012 | Erhart et al. |
| 2013/0085791 A1* | 4/2013 | Flockhart et al. ............ 705/7.13 |

* cited by examiner

*Primary Examiner* — Thjuan K Addy
(74) *Attorney, Agent, or Firm* — Sheridan Ross P.C.

(57) ABSTRACT

An event logging and analysis system and method are disclosed. The event logging and analysis system are described as being configured to analyze decisions made by a work assignment engine in a contact center, map the decisions to one or more events for a contact center entity, and storing information about the event in a buffer associated with the contact center entity, the information stored in the buffer describing how the new decision affected the contact center entity.

20 Claims, 5 Drawing Sheets

GLOBAL LOGGING AND ANALYSIS SYSTEM

FIELD OF THE DISCLOSURE

The present disclosure is generally directed toward communications and more specifically toward event logging in computational environments.

BACKGROUND

A contact center's success is defined by whether or not the contact center meets or fails to meet certain criteria. Performance analysis including optimization of resources is very important in determining whether or not a contact center is meeting its targets or goals. There are books, equations/algorithms, strategies, applications, and countless other ways to model, implement, and measure the efficiencies in a contact center. What is lacking, however, is a way to prove that the work assignment engine has faithfully implemented these models.

SUMMARY

With a desire to analyze and understand the contact center system at a detailed level, it would be advantageous to have the ability to look into the work assignment engine to see why it is doing what it is doing. It would also be very useful to have a tool to provide reports/data on why a piece of work was treated the way it was treated.

It is with respect to the above issues and other problems that the embodiments presented herein were contemplated. This disclosure proposes, among other things, the ability to look into a work assignment engine to see why it is doing what it is doing. Another aspect of the present disclosure is to provide a tool configured to deliver data on why a piece of work was treated the way it was treated—or even more accurately why the piece of work was not treated in an alternative way. Such a tool proves useful for sales, customer analyses, and services troubleshooting, among others.

Every contact center wants to be able to analyze and understand the system, especially the work assignment engine (e.g., the logic that makes the work assignment decisions). Currently available tools are not able to give that kind of useful information, especially with logging (e.g., logging currently occurs at 350 MB/s, which is effectively useless because any traditional logging performed at a desired rate would create more than 3TB/hr in a traditional log file). A different model is needed to understand the behavior of the work assignment engine in detail. It's not enough to just record events when they occur.

Accordingly, embodiments of the present disclosure provide the ability to look into a work assignment engine to see why it is doing what it is doing. Embodiments of the present disclosure also provide one or more tools configured to tell an administrator or sales person why a piece of work was treated the way it was treated by the work assignment engine. Such a tool could be used to prove one or more of the following: (1) that the work assignment engine is working as it is supposed to; (2) that the work assignment engine is working as advertised; and/or (3) to troubleshoot the work assignment engine and its behavior on a decision-by-decision basis.

Embodiments of the present disclosure propose that for each contact center entity (e.g., resource, work item, service, group, calendar, etc.), a circular buffer is provided. The circular buffer for each contact center entity is configured to store all of the events that happen over time with respect to that entity. In some embodiments, the buffer is circular so that only relevant history for each entity is maintained for a predetermined amount of time (e.g., 5 hrs of history). In some embodiments, every entity in the contact center gets its own circular buffer. A record takes an event (e.g., routing consideration) and records that event in a compressed format (e.g., uses bits for fields rather than bytes or words). The record queues write to disk, record and store in real-time or can be written to disk at any other time. This information can be used to quantify what happened to even the smallest piece of work or used to troubleshoot why the work assignment engine didn't do what was expected.

In some embodiments, the system disclosed herein could be configured to dynamically allocate bits based on how often an event (e.g., consideration) occurs and the system could further store the event information in a bit vector format. As one example, each bit may have a reason for occurring or each bit may refer to an index in a dictionary. The use of bits and dictionaries allows for fast matching and troubleshooting. Bitmapping or bit compression can be used for large collections of entries with a differential storage of frames (e.g., use key frame and differential frames rather than complete records for each entry). The efficiency is also in the storing of the differentials using differential framing. For example, full storage may not be efficient if the record is substantially 1s or substantially 0s. If almost all 0s, 20 some 1s→the system may compress and store [bit compression for large collections].

As can be appreciated, system administrators, sales people, and services people could use the logging and analysis modules disclosed herein to significantly enhance the contact center experience.

In accordance with at least some embodiments, a method is disclosed that comprises:

determining that a work assignment engine in a contact center has made a new decision;

mapping the new decision to an event for a contact center entity; and storing information about the event in a buffer associated with the contact center entity, the information stored in the buffer describing how the new decision affected the contact center entity.

The term "entity" or "contact center entity" may correspond to any instance or representation of a component within a contact center. Specifically, any human, computer hardware, computer software, or combination thereof for which a work assignment engine in a contact center can consider during a decision may be considered an entity or contact center entity for the purposes of this disclosure. Said another way, any variable or object considered by a work assignment engine in a contact center may be referred to as a contact center entity without departing from the scope of the present disclosure.

The term "agent" or "agent" can be construed to include one or more human agents operating one or more contact center endpoints. In some embodiments, an agent may correspond to a contact center supervisor, a trainee, or an agent. An agent may process a work item with or without the assistance of an automated processing resource. For instance, an automated system may be configured to generate proposed responses to work items or questions within work items. An agent may be allowed to select which among the automatically-generated responses are the best response and/or edit one of the automatically-generated responses. Accordingly, it may be possible that an agent is considered to be "processing" a work item when, in fact, an automated resource is being used to assist the agent in the processing of the work item.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
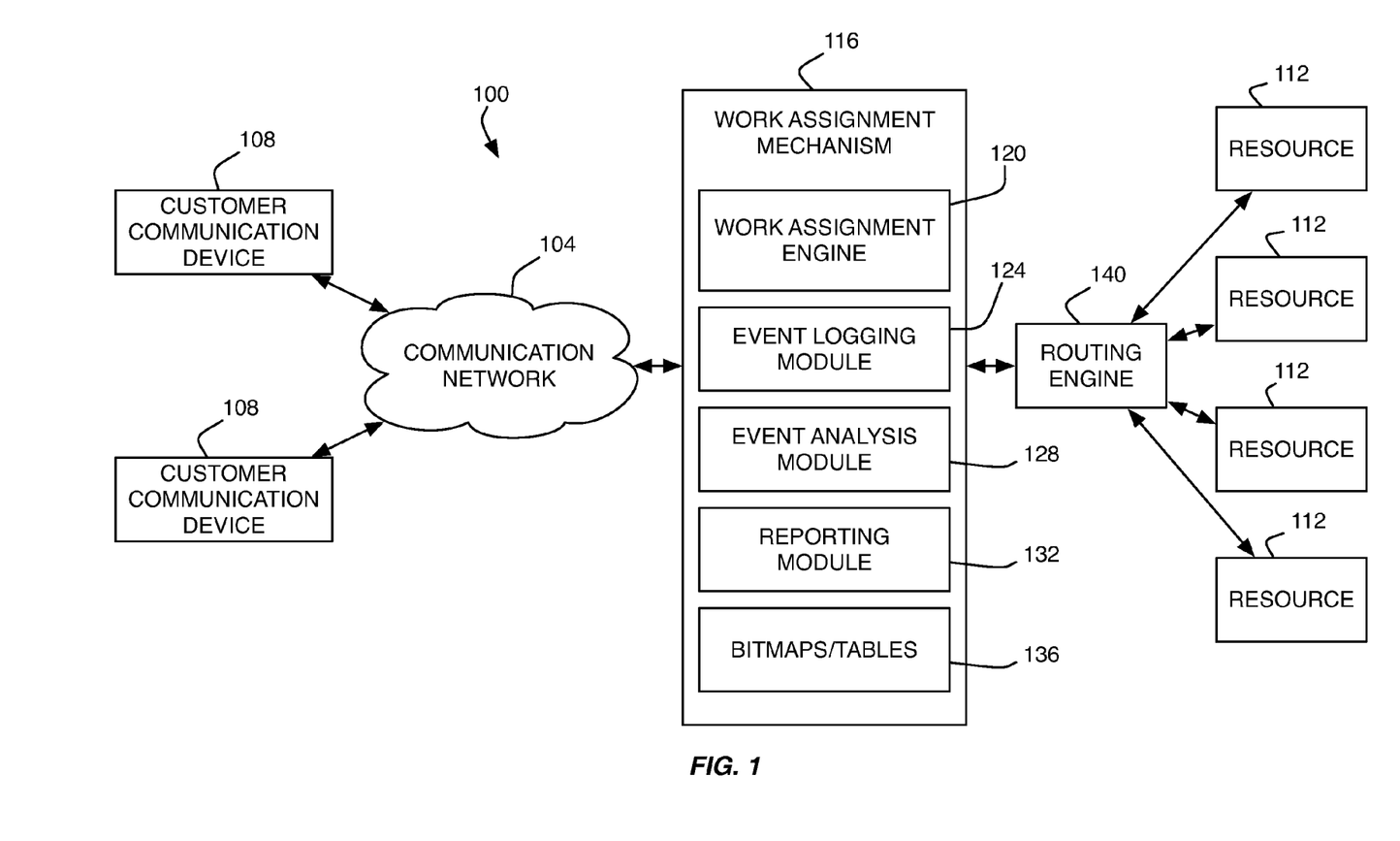
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle work items (in the form of contacts) from the customer communication devices 108.

In accordance with at least some embodiments of the present disclosure, the communication network 104 may comprise any type of known communication medium or collection of communication media and may use any type of protocols to transport messages or message fragments between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. Patent Publication Nos. 2010/0235218, 2011/0125826, and 2011/0125793, filed May 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center (e.g., the work assignment mechanism 116 of the contact center) of work to be performed in connection with servicing a communication/contact received at the contact center. The communication or contact associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 140 to connect the communication device 108 which initiated the communication with the assigned resource 112. The connection between the customer communication device 108 and a resource 112 may be effected by the routing engine 140 assigning one or more communication resources (e.g., sockets, buffers, physical ports, etc.) to establish a communication path (e.g., media stream such as RTP or SRTP) between the communication device 108 and resource 112. In some embodiments, the communication path established between the communication device 108 and resource 112 may also carry call control signaling, however, it may also be possible to maintain the signaling path at the work assignment mechanism 116. Alternatively, the customer communication device 108 may be initially connected to a conference bridge or the like by the routing engine 140 before any resource 112 is assigned to the contact. The work assignment mechanism 116 may later decide which resource(s) 112 are going to be assigned to the contact and, upon making such a decision, instruct the routing engine 140 to connect the selected resource(s) 112 to the conference bridge where the contact is being parked.

Although the routing engine 140 is depicted as being separate from the work assignment mechanism 116, the routing engine 140 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 140. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. Patent Application Serial No. 2011/0255683 filed Sep. 15, 2010, the entire contents of which are hereby incorporated herein by reference.

More specifically, the work assignment engine 120 can generate bitmaps/tables 136 and determine, based on an analysis of the bitmaps/tables 136, which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine optimal assignment of a work item to a resource 112). In some embodiments, the work assignment engine 120 is configured to achieve true one-to-one matching by utilizing the bitmaps/tables 136 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

As noted above, the work assignment engine 120 may be configured to make work assignment decisions for work items that have yet to be assigned to a resource 112 or agent. The work assignment engine 120 may be configured to consider every resource in the resource pool 212, regardless of whether that resource is available or unavailable to receive the work item.

The work assignment mechanism 116 may further comprise an event logging module 124, an event analysis module 128, and a reporting module 132. In some embodiments, the event logging module 124 may be configured to monitor the behavior of the work assignment engine 120 and determine when decisions are made which considered an entity within the contact center. When the event logging module 124 detects a decision by the work assignment engine 120 that considers one or more contact center entities (e.g., work items, resources 112, agents, calendars, etc.), the event logging module 124 may be configured to store information that describes the decision made by the work assignment engine 120 including the results of the decision, the variables considered by the work assignment engine 120 during the decision, and any other condition pertinent to the occurrence of the decision (e.g., time of decision, contact center conditions during decision, routing algorithm utilized by the work assignment engine 120 during the decision making process, what variables were ignored during the decision, etc.). The event logging module 124 may store the information about the decision in a buffer that is assigned or otherwise associated with the contact center entity that was impacted by the decision. Said another way, each contact center entity may have its own dedicated data structure stored in a dedicated buffer, such as a circular buffer. The event logging module 124 may be configured to store information about decisions made by the work assignment engine 120 in a buffer of a contact center entity if the decision considered, affected, or considered but did not affect the contact center entity.

The event analysis module 128 may be configured to analyze the various data structures that are built and maintained by the event logging module 124. More specifically, the event analysis module 128 may be configured to analyze specific decisions made by the work assignment engine 120 by reviewing and analyzing the decision information stored in the buffers assigned to various contact center entities. In some embodiments, the event analysis module 128 may be configured to analyze one or more entries in a contact center entity's associated buffer to determine when the contact center entity was considered by the work assignment engine 120 for a decision as well as what conditions resulted in the work assignment engine 120 ultimately making a decision that affected the contact center entity. This type of detailed analysis enables a contact center administrator or the like to utilize the event analysis module 128 to determine if the work assignment engine 120 is operating as expected, implementing the appropriate decision algorithm(s), and/or misbehaving.

The event analysis module 128 may be configured to report its analysis in various forms by invoking the reporting module 132. In some embodiments, the reporting module 132 may be configured to organize and deliver one or more reports that describe various decisions made by the work assignment engine 120 as determined by the event analysis module 128. As a non-limiting example, the event analysis module 128 may be configured to analyze any decision or set of decisions made by the work assignment engine 120 during a specific time or time period by analyzing every contact center entity's buffer to determine if that entity was considered or decided on by the work assignment engine 120 during the time period of interest. Any entry that is found by the event analysis module 128 may be sequenced according to the time when the decision was made and that sequence of decisions can be formatted into a report by the reporting module 132, and delivered to a human user (e.g., via email, text message, display screen, etc.), thereby enabling a human user to determine, with precise detail, what considerations were made by the work assignment engine 120 during a decision and why the work assignment engine 120 ultimately made the decision that it did.

Figure 2:
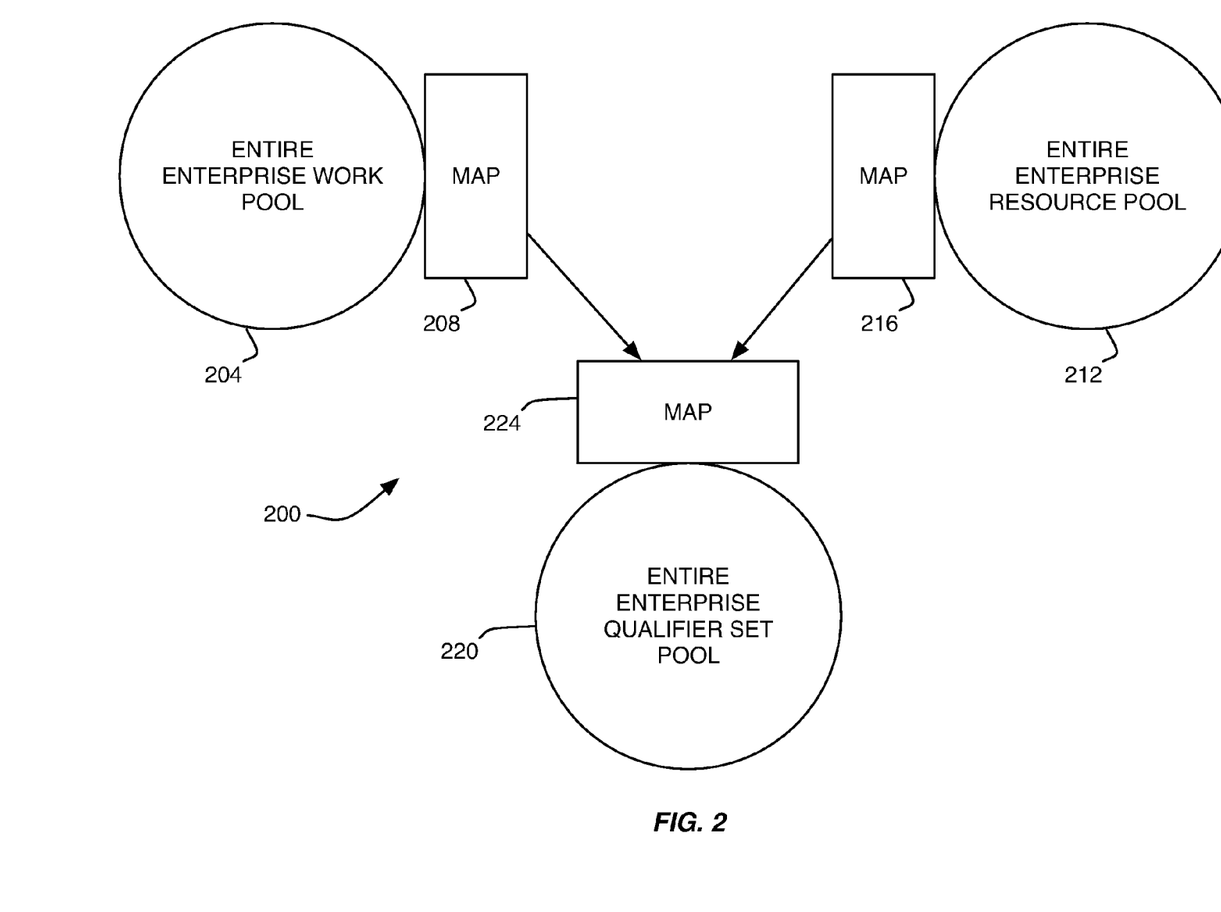
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables 136 used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center 100 at any given time.

In some embodiments, the population of the work pool 204 may be limited to work items waiting for service by or assignment to a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224. Furthermore, each bitmap 208, 216, 224 may be recalculated every time the state of the contact center changes, every time a new work item enters the contact center, every time a new resource becomes available, etc.

Figure 3:
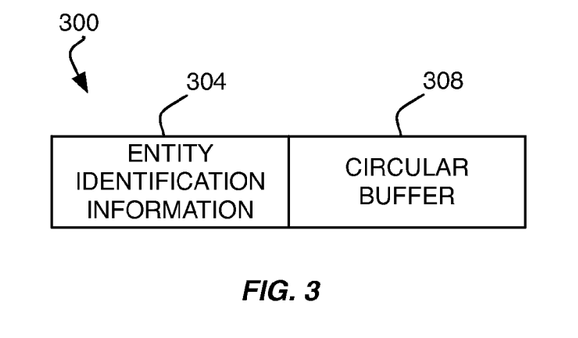
FIG. 3 is a block diagram depicting a first data structure in accordance with embodiments of the present disclosure.

With reference now to FIG. 3, details of another data structure 300 will be described in accordance with embodiments of the present disclosure. As noted above, the event logging module 124 may be configured to store information about each contact center entity as it is (1) considered by the work assignment engine; (2) affirmatively decided to have an action performed thereon by the work assignment engine 120 (e.g., a routing or work assignment decision); and/or (3) negatively decided to have an action performed thereon by the work assignment engine 120 (e.g., a consideration of the entity for a decision, but ultimately selecting a different entity for the decision).

In some embodiments, the data structure 300 can be stored in computer-readable memory. In some embodiments, the data structure 300 is created and maintained by the event logging module 124. Specifically, whenever the event logging module 124 detects that a decision made by the work assignment engine 120 considered and/or affected a contact center entity, the event logging module 124 may be configured to update a data structure for that contact center entity. Accordingly, a data structure such as data structure 300 may be maintained for each contact center entity. In other words, each work item, each resource, each agent, each calendar, each group, each service, etc., may have its own data structure 300 associated therewith.

In some embodiments, the data structure 300 for each contact center entity may include an identification information field 304 and a buffer portion 308. In more specific embodiments, the buffer portion 308 may correspond to a circular buffer 308, meaning that only a fixed number of memory locations may be included in the circular buffer 308 and entries in the circular buffer 308 may be discarded according to a predetermined algorithm (e.g., First-In-First-Out).

The identification information field 304 may comprise information that enables a unique identification of the entity within the contact center. For instance, a pseudo-randomly generated identification number may be contained in the identification information field. Other examples of identification information include, without limitation, entity name, entity ID information, entity status, entity definition, etc.

Figure 4:
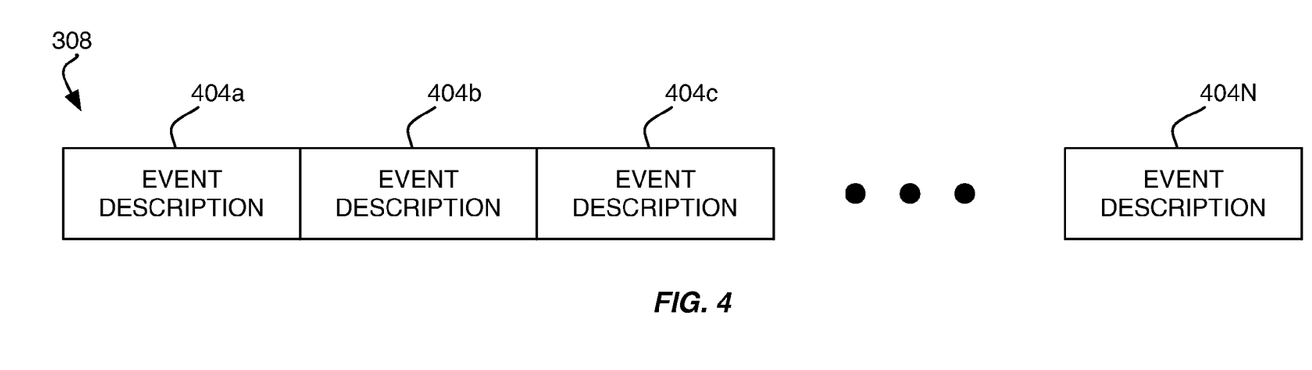
FIG. 4 is a block diagram depicting a second data structure in accordance with embodiments of the present disclosure.

With reference now to FIG. 4, further details of the buffer portion 308 will be described in accordance with at least some embodiments of the present disclosure. In some embodiments, each buffer portion 308 for each contact center entity may comprise a plurality of entries 404a-404N, where N is an integer greater than or equal to one. Each entry in the buffer portion 308 may comprise information that describes an event that occurred with respect to the associated contact center entity. Types of events that may occur with respect to a contact center entity include, without limitation, considerations of the contact center entity by the work assignment engine 120 during a decision (e.g., each resource 112 determined to be qualified to service a work item and/or each resource 112 determined to be available during a work item assignment decision), a decision made by the work assignment engine 120 that impacted or affected the contact center entity and how the decision affected the entity (e.g., a decision to assign a work item (one entity) to a resource 112 (another entity)), a decision made by the work assignment engine 120 that considered the entity but failed to impact or affect the entity (e.g., a consideration of a resource 112 as qualified to service a work item, but a failure to select the resource 112 to service the work item based on the fact that another resource 112 was better equipped to service the work item), etc.

As shown in FIG. 4, the buffer portion 308 may be organized in such a fashion as to chronologically order the event descriptions. As an example, the first event description 404a may correspond to the most recent event description related to a contact center entity, the second event description 404b may correspond to the second most recent description related to the contact center entity, the third event description 404c may correspond to the third most recent description related to the contact center entity, etc. It should be appreciated that each event description field 404a-N may comprise any amount of data sufficient to describe the event and/or circumstances surrounding an event for the contact center entity. In some embodiments, the fields 404a-N may comprise detailed information describing various aspects of an event in a textual or narrative description. In some embodiments, the fields 404a-N may comprise a single bit, string of bits, or bytes that simply describe whether a particular event occurred for the contact center entity. Each bit or byte value in the fields 404a-N may be mapped to a dictionary of events. Thus, a simple value in a contact center entity's buffer portion 308 can be mapped to a dictionary that describes the details of the decision made by the work assignment engine 120 that resulted in the creation of an entry in the buffer portion 308 for that entity.

Of course, relative time information for the events may be ascertainable by analyzing the order in which the events occur in the buffer portion 308. It should be appreciated, however, that any other ordering of the event description fields may be implemented without departing from the scope of the present disclosure.

As a non-limiting example, the event description fields 404a-N may store information describing an event for an entity, a creation of an entity (e.g., likely the first event description created for an entity), a termination of an entity (e.g., likely the last event description created for an entity), a creation of a relationship between the entity and another entity (e.g., assignment of a work item to a resource), a termination of a relationship between the entity and another entity (e.g., a transfer of a work item away from a resource), or combinations thereof.

The number of event description fields 404a-N may vary from entity to entity and can depend upon any number of factors. For instance, entities of a certain type may be allowed to have a predetermined number of event description fields 404a-N or a predetermined number of events correlated to a predetermined number of time. As another example, entities may be allowed to have a circular buffer that is sized sufficient to store information related to that entity as well as any entity with which a relationship was established (e.g., a work item may initially be allowed 10 events in the circular buffer, but once assigned to a resource, the work item may be allowed to have more events corresponding to the allowable size of the circular buffer for the resource).

Figure 5:
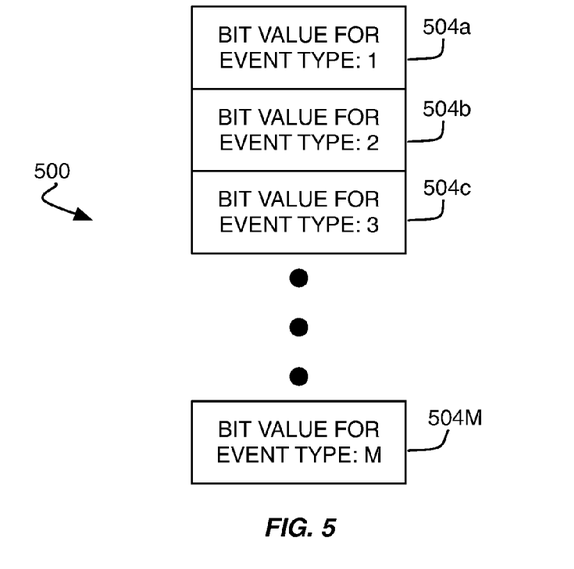
FIG. 5 is a block diagram depicting a third data structure in accordance with embodiments of the present disclosure.

With reference now to FIG. 5, details of another suitable data structure 500 that may be used in accordance with embodiments of the present disclosure will be described. The data structure 500 may correspond to a bit vector representation of the buffer portion 308. Specifically, each entry 504a-M, where M is an integer greater than or equal to one, may include a bit value for a specific event type. If an event occurs for the contact center entity at any given time (or at a predetermined time, within a predetermined time window, etc.), the bit value for that corresponding event type is switched from a first value to a second value (e.g., from 0 to 1 or from 1 to 0). The bit value in the corresponding entry 504a-M may signify whether the event occurred or whether a consideration was made for the entity.

Figure 6:
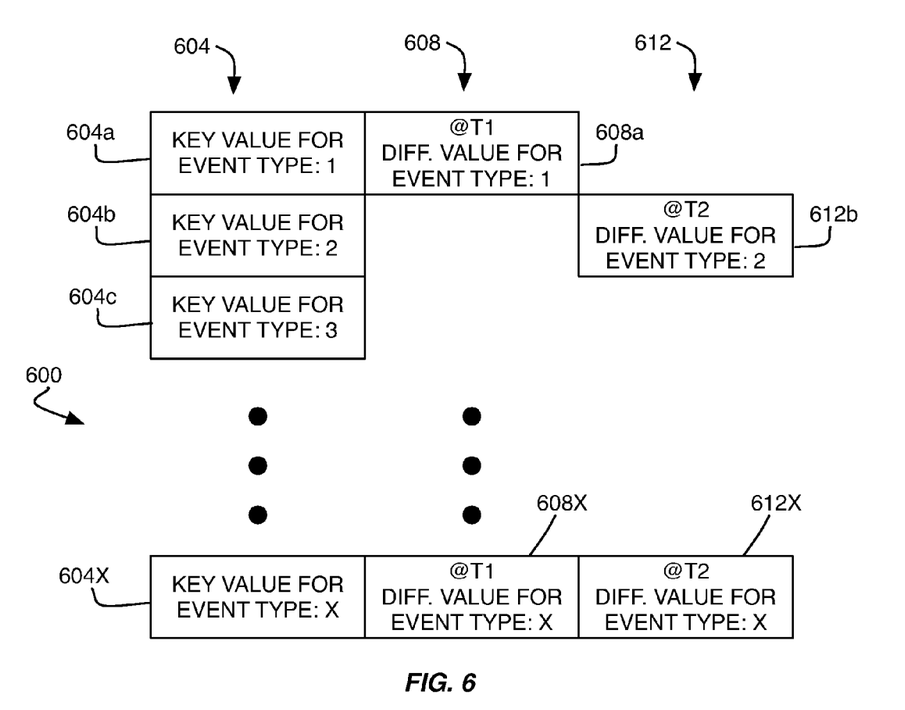
FIG. 6 is a block diagram depicting a fourth data structure in accordance with embodiments of the present disclosure.

As shown in FIG. 6, rather than using a single bit vector to describe whether a particular event occurred or a particular consideration was made at the work assignment engine 120, a plurality of differential storage frames 600 may be utilized to store event and consideration data for an entity. Specifically, a first bit vector 604 may comprise a plurality of key values 604a-X, for each possible event type. A second bit vector 608 may comprise differential values for the event types at a first time. A third bit vector 612 may comprise differential values for the event types at a second time.

As can be seen in FIG. 6, not every event type or consideration will occur for an entity at every time period. Thus, the need to store an entire bit vector for each event type at each time is unnecessary. Rather, it may be possible to only store bit values in the data structure 600 if a corresponding event or consideration occurs (or doesn't). This enables a more efficient storage of event and/or consideration information for an entity, especially if most of the values in the bit vector would be of a common type (e.g., mostly 0's or mostly 1's). It should also be appreciated that as time progresses, the circular buffer concept may be invoked to delete or overwrite the memory blocks dedicated to the oldest differential values so as to make room for new differential values associated with the most current time.

Figure 7:
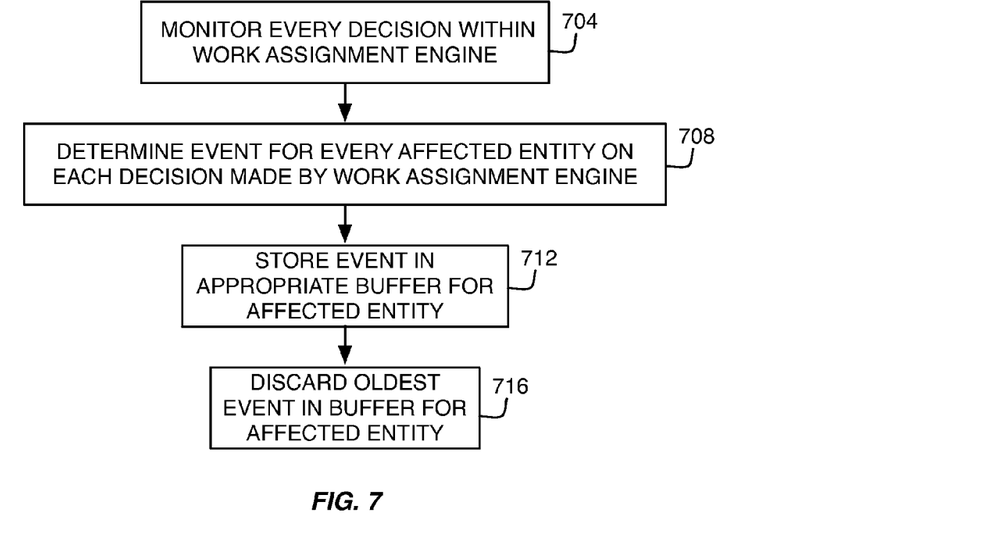
FIG. 7 is a flow chart depicting an event logging method in accordance with embodiments of the present disclosure.

With reference now to FIG. 7, an event logging method will be described in accordance with embodiments of the present disclosure. The method begins with the event logging module 124 monitoring the work assignment engine 120 for decisions or considerations made by the work assignment engine 120 (step 704). In particular, the event logging module 124 may monitor the work assignment engine 120 to determine whether, when, and to what extent a decision or consideration is made for contact center entities.

When the event logging module 124 detects that the work assignment engine 120 has made a decision or consideration, the method proceeds with the event logging module 124 determining which contact center entities were affected and/or considered during the detected decision or consideration (step 708). Also, during the step the event logging module 124 may be configured to determine what type of decision was made by the work assignment engine 120, what variables were considered by the work assignment engine 120, what the state of the contact center was during the decision, etc.

The event logging module 124 then updates the appropriate buffers for each entity that was affected and/or considered during the detected decision (steps 712 and 716). It should be appreciated that the step of removing the oldest event entry from the buffer and writing the newest event entry into the buffer may be performed in any order or simultaneously. As one example, the newest event entry (and information related thereto) may overwrite the oldest event entry and its information. As another example, the oldest event entry may first be discarded (e.g., deleted) and thereafter the newest event entry may be written. The manner in which the event entries are written may depend upon the type of data structure that is being updated. For instance, a detailed textual description of the event may be written into the buffer. Alternatively or additionally, a bit value may be written, updated, deleted, switched, etc. to indicate that the event occurred.

Figure 8:
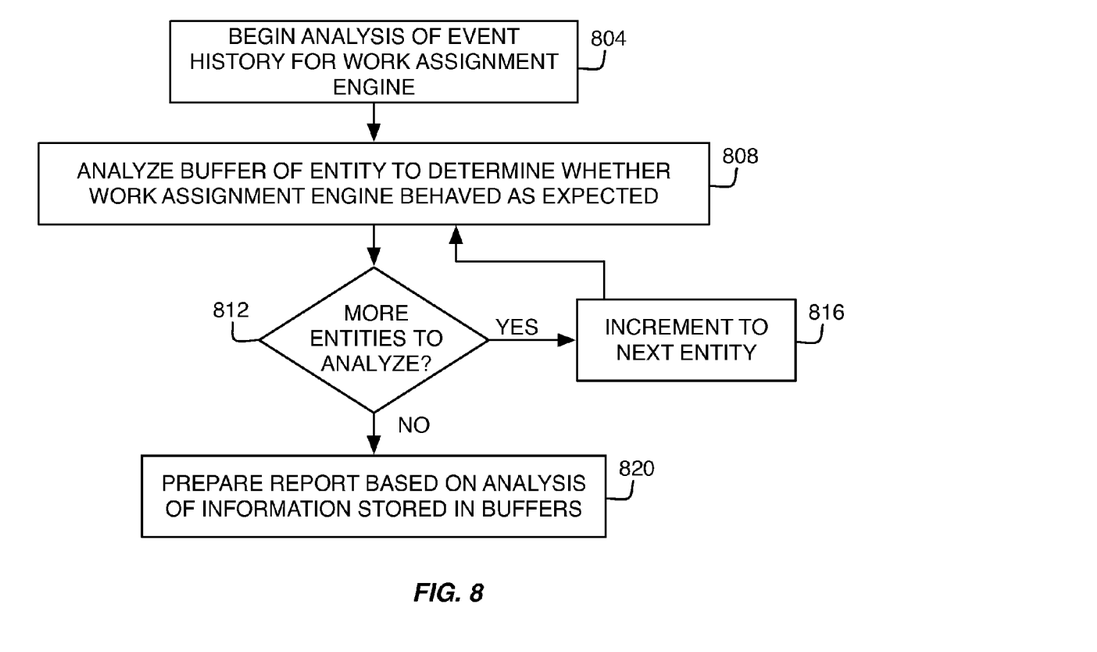
FIG. 8 is a flow chart depicting an event analysis method in accordance with embodiments of the present disclosure.

With reference now to FIG. 8, an event analysis method will be described in accordance with embodiments of the present disclosure. The method starts with the event analysis module 128 beginning an analysis of the decision history for the work assignment engine 120 (step 804). This analysis may be performed for a specific time, a specific time period, and/or a specific number of past decisions.

Once the appropriate analysis window or time frame has been determined, the method proceeds with the event analysis module 128 analyzing the buffers of some or all entities in the contact center to determine which and how may entities have an entry associated therewith that occur within the analysis window or time frame (step 808). For example, the event analysis module 128 may determine that it will analyze the past 20 decisions made by the work assignment engine 120 and any entity that has an event stored for one or more of the past 20 decisions will be analyzed. As another example, the event analysis module 128 may determine that it will analyze all decisions made by the event analysis module 128 within the last 20 seconds, 20 minutes, etc.

The event analysis module 128 then proceeds to analyze the buffers of each entity that has an event or consider within the time frame being analyzed (steps 812 and 816). Once the event analysis module 128 has analyzed all of the appropriate events and entities, the event analysis module 128 invokes the reporting module 132 to prepare and distribute one or more reports in accordance with the analysis results obtained during steps 812 and 816 (step 820). In particular, the event analysis module 128 may simply report on the number, order, and types of events and/or considerations that occurred. In some embodiments, the event analysis module 128 may cause the reporting module 132 to prepare a report that indicates why certain decisions were made, what alternative considerations were made during those decisions, what other factors existed during the consideration, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    determining that a work assignment engine in a contact center has made a new decision;
    mapping the new decision to an event for a first contact center entity; and
    storing information about the event in a first buffer associated with the first contact center entity, the information stored in the first buffer describing how the new decision affected the first contact center entity, wherein the information includes at least one event entry having a bit value and a storage location in the first buffer, wherein the bit value is configured to indicate whether the event occurred, and wherein the storage location is configured to identify the event.

2. The method of claim 1, further comprising:
    determining one or more considerations that were made by the work assignment engine during the new decision;
    mapping the one or more considerations to an event for a second contact center entity; and
    storing information about the event in a second buffer associated with the second contact center entity, the information stored in the second buffer describing the one or more considerations made by the work assignment engine.

3. The method of claim 2, wherein the first contact center entity was selected during the new decision instead of the second contact center entity and wherein the information stored in the second buffer describes why the work assignment engine selected the first contact center entity and not the second contact center entity.

4. The method of claim 1, wherein the first buffer comprises a circular buffer, the method further comprising:
    deleting at least one entry from the first buffer to make room for the information about the new event, wherein the at least one entry is deleted prior to or during the storing of the information about the event.

5. The method of claim 1, wherein the first buffer comprises a bit vector and each bit in the bit vector corresponds to a predetermined event type.

6. The method of claim 1, wherein the first buffer comprises a key frame and differential frames, wherein the key frame store key values for a corresponding event type, and wherein the differential frames store values describing changes relative to the key values.

7. The method of claim 1, wherein the first contact center entity comprises at least one of a work item, a resource, an agent, a group of agents, a service, and a calendar.

8. The method of claim 1, further comprising:
    analyzing one or more buffers associated with one or more contact center entities;
    based on the analysis of the one or more buffers, identifying one or more discrete decisions made by the work assignment engine during a selected period of time; and
    preparing a report that describes the identified one or more decisions including one or more of the following: what considerations were made by the work assignment engine during the one or more discrete decisions, what contact center entities were considered and not selected during the one or more decisions, and what algorithm was being utilized by the work assignment engine during the one or more decisions.

9. The method of claim 8, wherein the one or more decisions comprise at least one work item assignment decision.

10. A non-transitory computer readable medium having stored thereon instructions that cause a computing system to execute a method, the instructions comprising:
    instructions configured to determine that a work assignment engine in a contact center has made a new decision;
    instructions configured to map the new decision to an event for a first contact center entity; and
    instructions configured to store information about the event in a first buffer associated with the first contact center entity, the information stored in the first buffer describing how the new decision affected the first contact center entity, wherein the information includes at least one event entry having a bit value and a storage location in the first buffer, wherein the bit value is configured to indicate whether the event occurred, and wherein the storage location is configured to identify the event.

11. The computer readable medium of claim 10, wherein the instructions further comprise:
    instructions configured to determine one or more considerations that were made by the work assignment engine during the new decision;
    instructions configured to map the one or more considerations to an event for a second contact center entity; and
    instructions configured to store information about the event in a second buffer associated with the second contact center entity, the information stored in the second buffer describing the one or more considerations made by the work assignment engine.

12. The computer readable medium of claim 11, wherein the first contact center entity was selected during the new decision instead of the second contact center entity and wherein the information stored in the second buffer describes why the work assignment engine selected the first contact center entity and not the second contact center entity.

13. The computer readable medium of claim 10, wherein the first buffer comprises a circular buffer.

14. The computer readable medium of claim 10, wherein the first buffer comprises a bit vector and each bit in the bit vector corresponds to a predetermined event type.

15. The computer readable medium of claim 10, wherein the first buffer comprises a key frame and differential frames, wherein the key frame store key values for a corresponding event type, and wherein the differential frames store values describing changes relative to the key values.

16. The computer readable medium of claim 10, wherein the first contact center entity comprises at least one of a work item, a resource, an agent, a group of agents, a service, and a calendar.

17. A contact center, comprising:
a processor configured to execute programming instructions stored in memory; and
memory comprising instructions that are executable by the processor, the instructions including:
an event logging module configured to determine that a work assignment engine in a contact center has made a new decision, map the new decision to an event for a first contact center entity, and store information about the event in a first buffer associated with the first contact center entity, the information stored in the first buffer describing how the new decision affected the first contact center entity, wherein the information includes at least one event entry having a bit value and storage location in the first buffer, wherein the bit value is configured to indicate whether the event occurred, and wherein the storage location is configured to identify the event.

18. The contact center of claim 17, wherein the first buffer comprises a circular buffer and wherein the first buffer comprises a bit vector and each bit in the bit vector corresponds to a predetermined event type.

19. The contact center of claim 17, wherein the first contact center entity comprises at least one of a work item, a resource, an agent, a group of agents, a service, and a calendar.

20. The contact center of claim 17, wherein the instructions further include an event analysis module configured to analyze one or more buffers associated with one or more contact center entities, based on the analysis of the one or more buffers, identify one or more discrete decisions made by the work assignment engine during a selected period of time, and then invoke a reporting module to prepare a report that describes the identified one or more decisions including one or more of the following: what considerations were made by the work assignment engine during the one or more discrete decisions, what contact center entities were considered and not selected during the one or more decisions, and what algorithm was being utilized by the work assignment engine during the one or more decisions.

\* \* \* \* \*